J. K. SAX.

Casting Car-Wheels.

No. 5,716. Reissued Dec 30, 1873.

Witnesses.

John Pollitt

Hannah P. Freeman

Inventor

John K. Sax

By Wm. Ed. Simonds

Atty.

UNITED STATES PATENT OFFICE.

JOHN K. SAX, OF PITTSTON, PENNSYLVANIA.

IMPROVEMENT IN CASTING CAR-WHEELS.

Specification forming part of Letters Patent No. 122,538, dated January 9, 1872; reissue No. 5,716, dated December 30, 1873; application filed April 15, 1873.

*To all whom it may concern:*

Be it known that I, JOHN K. SAX, of the borough of Pittston, in the county of Luzerne and State of Pennsylvania, have invented a new and useful Improvement having reference to the Manufacture of Railway-Car Wheels, of which the following is a specification, reference being had to the accompanying drawings, in which—

Figure 1:
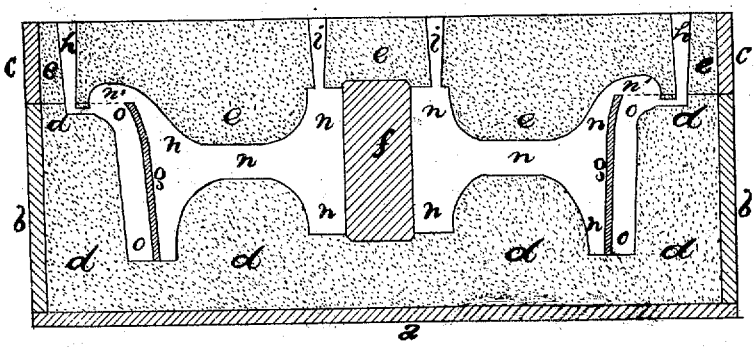
Figure 2:
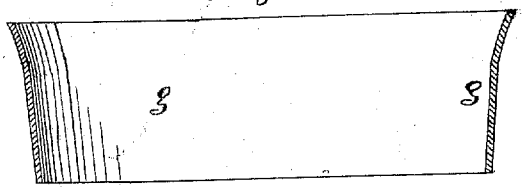

Figure 1 is a view in central vertical transverse section of a wheel-flask containing a mold, made of common casting-sand, wherein to cast a railway-car wheel when making use of my said improvement. Fig. 2 is a view in central vertical transverse section of the band which I make use of to keep separate, while being cast, the different kinds of metal of which the wheel is composed.

The invention consists in casting the body or center of the wheel of one kind or quality of metal adapted to the purpose, while the tread, tire, or face is cast at the same time, and in the same mold, of another kind or quality of metal, adapted to the purpose of forming such tire, the two different kinds or qualities of metal being kept apart while being cast by a metallic band or its equivalent, the band in the process of casting becoming fluid with the metals upon either side of it.

The wheels most in use upon steam-railways are what are known as "chilled wheels," of cast-iron. The two great defects of these chilled wheels are, first, their liability to break from chill-strain, which is caused by suddenly chilling the rim or tread of the wheel in the process of casting, while the center or body of the wheel is yet in a molten state, and thus shrinking the outer rim of the wheel before the body or center of the wheel has commenced to shrink at all, thus producing uneven shrinkage in the wheel, and chill-strain; and, second, the necessity of subjecting wheels thus chilled to an annealing process, which is in most cases imperfect and expensive.

My object is to overcome these difficulties.

The letter *a* indicates the bottom board, upon which the flask and mold are set to the lower part or drag of the flask, and *c* the upper part or cap. The letter *d* indicates the sand in the drag; *e*, the sand in the cap, and *f* the core, which forms the hole in the hub for the reception of the axle. The letter *g* indicates an annular band of iron or its equivalent. This band serves to keep separate, in the process of casting, the two kinds or qualities of metal of which the whole wheel is cast.

The metal which forms the body or center of the wheel is poured through sprues or channel-ways entering the matrix of the mold within the band *g*. The letters *i i* indicate such sprues. The metal which forms the tread, or tire, or rim of the wheel is poured through sprues or channel-ways entering the matrix of the mold outside of the band *g*. The letters *h h* indicate two such sprues. The center or body of the wheel is cast of a tough and strong metal adapted to the purpose. Soft cast-iron is such a metal. The tread, or rim, or tire of the wheel is cast of a hard metal adapted to resist wear. Hard or white cast-iron is such a metal. The two metals are poured through their respective sprues at or about the same time, so as to rise on opposite sides of the band *g*. The pouring of the metal for the tread ceases when the metal rises to the top of the separating band. The band is held in its place in the mold by chaplets, similar to those used in fastening cores in molds.

Locomotive driving-wheels may be produced by this process, as well as common car-wheels. The mold itself may be of any suitable material.

I claim as my invention—

The process of simultaneously casting the body of a car or engine wheel of one kind or quality of metal, and the tread or rim of another kind or quality of metal, by means of a circumferential band in the mold, which keeps the two metals apart while being poured, the whole being done substantially in the manner and for the purpose set forth.

JOHN K. SAX.

Witnesses:

WM. ED. SIMONDS,

JOHN POLLITT.